F. A. CARPENTER.
COULTER OR CULTIVATOR DISK SHARPENER.
APPLICATION FILED JUNE 21, 1915.

1,169,460.

Patented Jan. 25, 1916.
2 SHEETS—SHEET 1.

Witnesses:
W. T. Smith
Florence Mitchell

Inventor:
Frederick Albert Carpenter
by Frank D. Thomason
Atty.

F. A. CARPENTER.
COULTER OR CULTIVATOR DISK SHARPENER.
APPLICATION FILED JUNE 21, 1915.
1,169,460.
Patented Jan. 25, 1916.
2 SHEETS—SHEET 2.
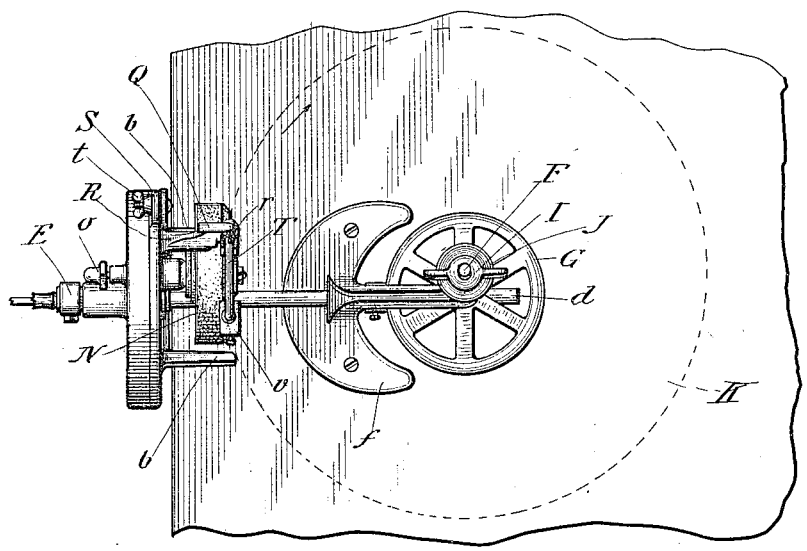
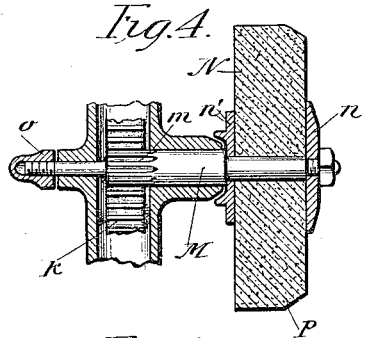
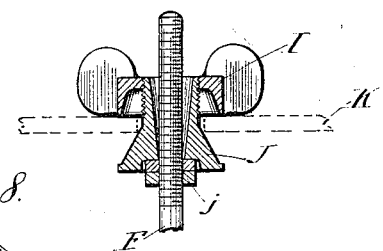
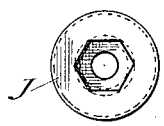
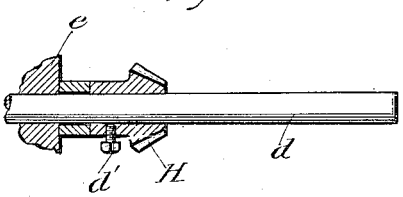
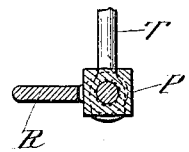
Witnesses:
W. T. Smith
Florence Mitchell
Inventor:
Frederick Albert Carpenter,
by Frank R. Thomason
Atty.

UNITED STATES PATENT OFFICE.

FREDERICK ALBERT CARPENTER, OF CHICAGO, ILLINOIS.

COLTER OR CULTIVATOR-DISK SHARPENER.

1,169,460.  Specification of Letters Patent.  Patented Jan. 25, 1916.

Application filed June 21, 1915. Serial No. 35,267.

*To all whom it may concern:*

Be it known that I, FREDERICK ALBERT CARPENTER, a subject of His Majesty the King of the United Kingdom of Great Britain and Ireland, (having declared his intention of becoming a citizen of the United States,) residing at Chicago, in the county of Cook and State of Illinois, have invented new and useful Improvements in Colter or Cultivator-Disk Sharpeners, of which the following is a full, clear, and exact description.

My invention relates to mechanism for grinding and sharpening disks, and particularly the disks or colters for cultivators and other agricultural implements.

The objects of my invention are to sharpen the circular edges of such disks evenly around their entire circumference, to remove the bur that may be produced when thus grinding said disks in a very easy and expeditious manner, and, by holding the work yieldingly in contact with the grinding wheel, prevent the wavy effect or fluting of the edge being sharpened. This I accomplish by the means hereinafter fully described, and as particularly pointed out in the claims.

Figure 1:
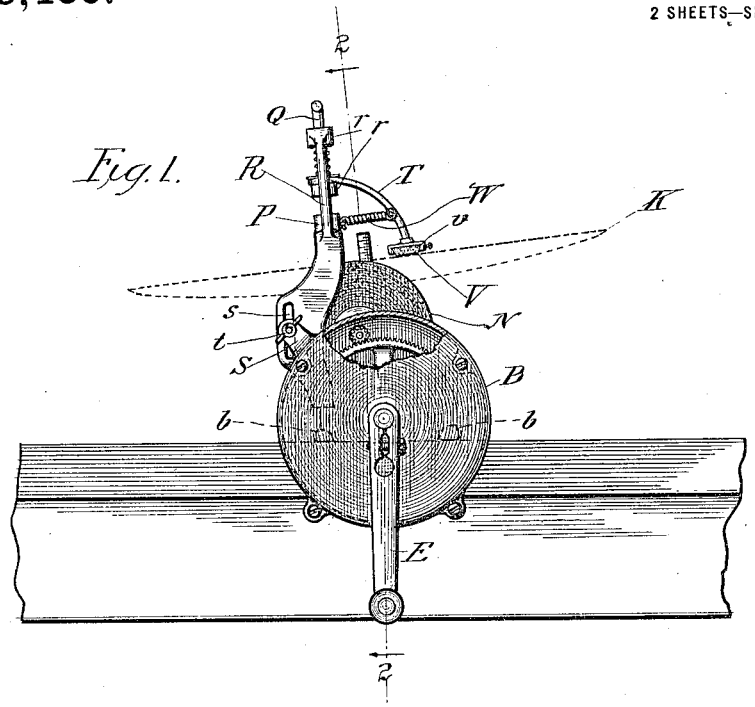
Figure 2:
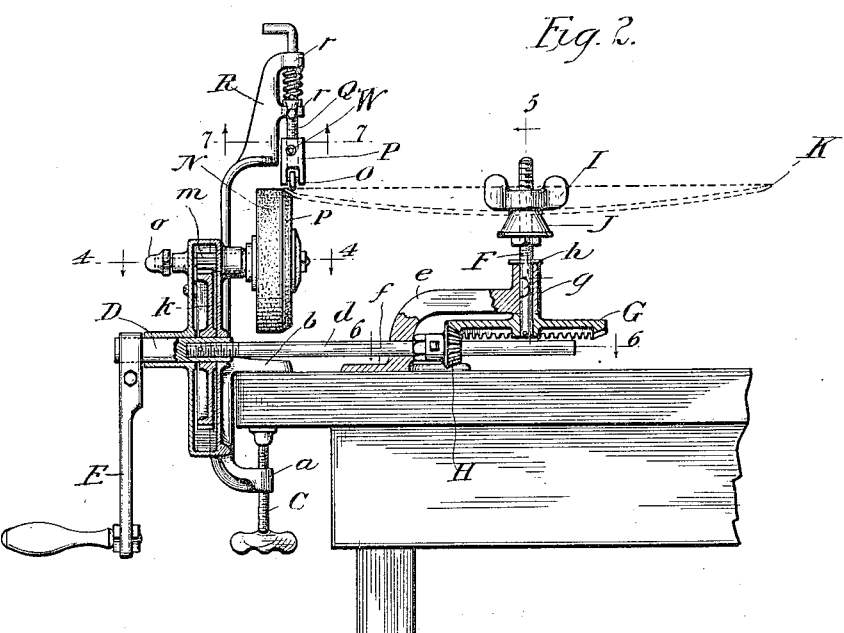

In the drawings: Figure 1 is a front elevation of my invention attached to the side of a fragment of a table and showing a portion of the gear-casing broken away. Fig. 2 is a side elevation thereof showing a section of the gear-casing and other parts of my improved machine, taken on dotted line 2—2, Fig. 1. Fig. 3 is a plan view of the same. Fig. 4 is a detail view showing a fragment of the machine, including the gearing connecting the drive-shaft to the grinding-wheel shaft in section, taken on dotted line 4—4, Fig. 2, and drawn to a larger scale. Fig. 5 is a section of the upper portion of the disk supporting shaft taken on dotted line 4—4, Fig. 2. Fig. 6 is a detail view showing the drive-shaft extension in longitudinal section on dotted line 6—6, Fig. 3, drawn to a larger scale. Fig. 7 is a transverse section taken on dotted line 7—7, Fig. 2. Fig. 8 is a plan view of the underside of the disk supporting member, shown in Fig. 5.

Referring to the drawings, A represents a table or other suitable support the edges of the top of which overhang. My invention comprises a suitable gear-casing B, which is, preferably, made in two circular sections suitably secured together, substantially as shown in the drawings, and secured to the overhang of the top of the table by means of a clamp made integral with the inner section of the casing and consisting of a downwardly and inwardly projecting arm $a$ and two inwardly projecting arms $b$, $b$. The arms $b$ are adapted to rest upon the upper surface of the top of the table, and the arm $a$ passing under the same and is provided with a screw C by properly manipulating which so that its upper end engages the underside of the overhang of the table top will securely clamp said gear-casing in position.

The centers of the sections of the gear-casing are provided with bearings for a drive-shaft D and the bearings of the outer section extend outward a suitable distance and the outer end of the drive-shaft extends beyond this bearing and is provided with a crank E with which to turn it. Drive-shaft D has its inner end provided with a screw-threaded bore and the end of an alining extension $d$ of the drive-shaft is screwed into this bore and locked therein by a transverse pin or other means, substantially as shown in Fig. 2 of the drawings. The portion of this extension $d$ opposite the drive-shaft passes through and is journaled in bearings near the base of an inverted L-shaped frame or goose-neck $e$, and the root of the latter merges into a suitable screw-plate $f$ that is secured by screws or otherwise to the top of the plate, substantially as shown in Fig. 3 of the drawings. The end of the overhang of this goose-neck is provided with vertical bearings $g$ in which the vertical disk supporting-shaft F is journaled. Immediately above bearings $g$ shaft F has a pin $h$ passed therethrough that engages the top of said bearings and retains the shaft in its proper relative position. The lower end of shaft F extends below bearings $g$ and has a comparatively large bevel gear G secured thereon. This gear G is diven by a bevel pinion H that is mounted upon and securely clamped to shaft extension $d$ by a set-screw $d'$.

As will hereinafter more fully appear, my improvements may be employed to grind and sharpen disks of different diameters. To accomplish this, pinion H is adjustable longitudinally on extension $d$, and goose-neck $e$ can be moved toward or from the gear-casing so as to accommodate the machine to large or small disks. The screws used to secure plate $f$ to the table are, preferably, small, in order to permit of the adjustment of the goose-neck.

The upper end of shaft F is screw-threaded and a couple of nuts $j$ are screwed thereon and form a support for a supporting-head J, which latter has a polygonal recess in its bottom the sides of which correspond to the sides of set-nuts over which they are adapted to fit, substantially as shown in Fig. 5 of the drawings. The lower portion of head J has its sides made coniform in shape, and the upper cylindrical portion is screw-threaded and has a cap or arbor screwed thereon. In practice the disk K, shown in dotted lines in the drawings, has its central openings slipped down over head J until the edges thereof rest upon and are held by the coniform sides thereof, and then arbor I is screwed down upon the upper screw-threaded portion of the head so as to center and clamp the disk thereon. The bore of head J is slightly funnel shaped, so as to permit of the automatic adjustment of the disk when it is engaged by the grinding-wheel, as will hereinafter more fully appear.

Shaft D has a large gear $k$ mounted thereon inside of the gear-casing, and this gear engages a pinion $m$ cut in the barrel of a shaft M, which is journaled in suitable bearings in the upper segment of the sections of the gear-casing. One end of this shaft M is reduced in diameter and extends toward shaft F, and has the grinding-wheel N mounted and secured thereon by means of arbors $n$, $n$. The opposite end of shaft M is reduced in diameter and extends out beyond its bearings and is screw-threaded and provided with a cap $o$, which latter, when removed, permits shaft M and its grinding-wheel to be removed from the casing in the direction of shaft F. The grinding-wheel N has the portion of its circumference nearest shaft F provided with a suitable bevel $p$, and the edges of the disk mounted upon shaft $f$ is adapted to engage and to be sharpened by this bevel portion upon which it is held by a suitable presser-foot P. This presser-foot has a small anti-friction wheel $x$ journaled in the bifurcations of the lower end thereof, and its body consists of a square sleeve mounted and secured by means of a set-screw $q$ upon the lower end of a vertical spindle Q the cylindrical portion of which extends up through guide-lugs $r$, $r$, and has its upper end bent laterally to form a hand-grasp with which to lift it, when desired. These lugs $r$ project from the upper end of a bracket R the lower end of which is formed into a flat plate by means of which it is secured to the inner section of the gear-casing. This supporting-plate of the bracket is provided with a vertical slot $s$ and it is secured to a lug S projecting laterally from the inner section of the gear-casing by means of a screw extending through the slot into the lug that is tightened by a thumb-nut $t$.

Just above the lower guide-lugs $r$, spindle Q has a boss securely mounted thereon from which an arm T projects laterally and downwardly a suitable distance. The lower end of this arm T has a shoe $v$ secured thereto, and this shoe has a dovetail recess in its underside for the reception of a correspondingly shaped grind stone V, which is held in place, as shown in Fig. 1 of the drawings, by a set-screw. This arm is kept bearing downward by the expansion of a coil-spring W one end of which is secured to said arm and the other to presser-foot P.

In operation, after the disk has been mounted and secured upon shaft F, as hereinbefore explained, and the edge of the disk rests upon the beveled portion of the grinding wheel N, the spindle Q is lifted by grasping its upper bent end to permit the edge of the disk to be moved under it and is then released until the anti-friction wheel O of the presser-foot bears down upon the same and the grinding-stone V rests upon the edge of the disk, as shown in Fig. 1 of the drawings. The crank E is then turned, thus causing the disk to revolve at a reduced speed through the medium of pinion H and beveled gear G and the grinding-wheel N to revolve at a high rate of speed in the opposite direction through the medium of gear $k$ and pinion $m$ and to engage and sharpen the underside of the marginal edges of the disk. Should this grinding result in the creation of a bur on the circumference of the disk the grinding-stone V removes it and thus sharpens the disk in a more even and thorough manner than could possibly be done by hand, and in a much faster manner than it can now be done by the means employed for that purpose.

Attention is called to the fact that, in view of the differences in the thickness of the disks it is necessary to adjust the presser-foot in the lower screw-threaded end of the spindle Q. This can readily be done by turning the spindle through the medium of its upper bent end either to the right or to the left, according as it is desired to raise or lower the presser-foot to get the right pressure of the same upon the disk.

What I claim as new is:

1. A sharpening machine comprising a grinding-wheel, speed increasing gearing for revolving the same, a shaft the axis of which is at an angle to that of said grinding-wheel, speed reducing gearing for actuating the same, and means including a nut on said shaft, a head loosely mounted on said shaft having a funnel-shaped bore and having a depression in its bottom that fits over said nut and having the lower portion of its side coniform, and a nut adapted to be screwed onto the upper screw-threaded portion of said head.

2. A sharpening machine comprising a grinding-wheel, a shaft the axis of which is at an angle to that of said wheel, means mounted on said shaft for sustaining and centering a disk, and a device engaging the circumference of said disk opposite said grinding-wheel for removing the bur therefrom.

3. A sharpening machine comprising a grinding-wheel, a shaft the axis of which is at an angle to that of said wheel, means for sustaining and centering a disk on said shaft, a presser-foot for holding the margins of said disk against said wheel, and a device engaging the same side of the disk as said presser-foot for removing the bur from the edge of the disk.

4. A sharpening machine comprising a grinding-wheel, a shaft the axis of which is at an angle to that of said wheel, means for sustaining and centering a disk on said shaft, a presser-foot for holding said disk against said wheel, and an arm projecting from said presser-foot, a shoe on the end of said arm, and a suitable grinding device carried by said shoe and adapted to engage the disk and remove the bur from the edges thereof.

5. A sharpening machine comprising a grinding-wheel, speed increasing gearing for revolving the same, a shaft the axis of which is at an angle to that of said wheel, speed reducing gearing for revolving the same, means mounted on said shaft for loosely sustaining and centering a disk, a presser-foot for holding said disk against said wheel, and a device engaging the edge of the disk opposite said wheel for removing the bur therefrom.

6. A sharpening machine comprising a grinding-wheel, speed increasing gearing for revolving the same, a shaft the axis of which is at an angle to that of said wheel, speed reducing gearing for revolving the same, means mounted on said shaft for loosely sustaining and centering a disk, including a head loosely mounted on said shaft the lower portion of which is coniform and the upper portion of which is cylindrical and screw-threaded, and a nut engaging said screw-threaded portion, a presser-foot for holding said disk against said wheel, and a device engaging the edge of the disk opposite said wheel for removing the bur therefrom.

7. A machine of the class described comprising a frame having an overhang, a grinding wheel rotatably mounted in said frame below the overhang, a bur removing device supported in the overhang over the grinding-wheel, and means for revolubly supporting a disk with its peripheral margin interposed between the grinding wheel and the bur removing device.

8. A machine of the class described comprising a frame having an overhang, a grinding-wheel rotatably mounted in said frame below the overhang, a bur removing device supported in the overhang over the grinding-wheel, spring means for tensioning said bur removing device, and means for revolubly supporting a disk with its peripheral margin interposed between the grinding-wheel and the bur removing device.

9. A machine of the class described comprising a frame having an overhang, a grinding-wheel rotatably mounted in said frame below the overhang, a bur removing device supported in the overhang over the grinding-wheel, means for revolubly supporting a disk with its peripheral margin interposed between the grinding-wheel and the bur removing device, and manual means for rotating both the grinding wheel and the disk supporting means.

In witness whereof I have hereunto set my hand this 16th day of June, 1915.

FREDERICK ALBERT CARPENTER.

Witnesses:
FRANK D. THOMASON,
FLORENCE MITCHELL.

Copies of this patent may be obtained for five cents each, by addressing the "Commissioner of Patents, Washington, D. C."